Sept. 5, 1961    J. F. FISHER    2,999,127
AMPLITUDE SELECTIVE AMPLIFYING SYSTEM
Filed Oct. 14, 1957    3 Sheets-Sheet 1

INVENTOR.
JOSEPH F. FISHER
BY
Robert D. Sanborn
ATTORNEY

INVENTOR.
JOSEPH F. FISHER
BY
Robert D. Sanborn
ATTORNEY

United States Patent Office

2,999,127
Patented Sept. 5, 1961

2,999,127
AMPLITUDE SELECTIVE AMPLIFYING SYSTEM
Joseph F. Fisher, Wynnewood, Pa., assignor to Philco Corporation, Philadelphia, Pa., a corporation of Pennsylvania
Filed Oct. 14, 1957, Ser. No. 690,150
11 Claims. (Cl. 178—7.5)

This invention relates to signal processing systems and more particularly to systems for differently amplifying selected amplitude ranges of an electrical signal.

Much scientific research is based on the interpretation of images of different apparent brightness such as cathode-ray oscilloscope presentations, fluoroscope presentations, photographic negatives and prints viewed by transmitted or reflected light. Further information is obtained by comparing the relative luminosity, transparency or reflectivity of two or more objects or two or more areas on the same object. In any of the situations mentioned significant information may be represented by differences in apparent brightness of the order of a small fraction of one percent. It is well known that the ability of the human eye to recognize a difference in brightness between two areas of approximately the same brightness is a function of the brightness of the two areas themselves and further is a function of the brightness of the surrounding area which lies within the field of view of the eye. In general, the minimum difference in brightness that can be recognized is a fixed fraction of the average brightness of the two areas. For the condition in which the surrounding area has a brightness approximately equal to the brightest of the two areas to be compared, the smallest difference in brightness that can be recognized is approximately 2% of the average brightness of the two areas. This percentage remains relatively constant over a range of brightness values extending from 0.1 foot lamberts to about 100 foot lamberts. As a result, the eye is unable to recognize much of the information recorded in transient or permanent images. To take a specific example, X-ray negatives record areas of different absorption of the subject as areas of different density. These areas of different density are made visible by illuminating the negative to convert areas of different density into areas of different brightness. In an X-ray negative of a portion of a human body certain features may be registered with good contrast and other features may be registered with only slight contrast. The difference in density between an area of a negative representing a certain tissue or bone structure and an adjacent area of the negative representing quite a different type of tissue or bone structure may be of the order of 1 percent or less. Similarly diseased tissue may be recorded on the negative by an area which differs in density from that representing healthy tissue by an amount which is of the order of 1 percent or less. Since the apparent brightness of each area of the illuminated negative is proportional to the density of that area, it is impossible to obtain a difference in apparent brightness which is greater than the difference in density, i.e. 1 percent in the examples mentioned above. This is so regardless of the intensity of the illuminating source. This has proved to be a great handicap in viewing photographic negatives and in particular X-ray negatives of the human body.

A photographic negative has been taken as an example of a subject in which information recorded in the form of small differences in density cannot be perceived directly by the human eye. However, as noted above the difference in the apparent brightness of different areas of a subject may depend on factors other than the density of a transparent subject. For example, it may depend upon a difference in luminosity of different areas of an excited phosphor screen or it may depend on the difference in reflectivity of different areas of a surface. Since apart from the subject scanning means the system to be employed for enhancing the visibility of the areas of different apparent brightness is substantially the same whether the difference in brightness is caused by a difference in luminosity, a difference in reflectivity or a difference in density, it will be convenient to continue the description of the invention in terms of the enhancement of the contrast between adjacent areas of a photographic negative, it being understood that no limitation on the scope of the invention is to be implied from this choice of a specific example. Also, it is convenient to refer to the areas of different apparent brightness of the subject as black, gray or white although spectral colors may be present. Thus an opaque or nearly opaque area of a photographic negative is termed "black," a transparent or nearly transparent area is termed "white," and areas of partial transparency are termed "gray." Similarly areas of no illumination on an intensity modulated cathode-ray tube are described as "black" while areas of maximum intensity are described as "white."

Systems have been proposed in the past in which the subject is scanned by a photoelectric device along a selected path to produce a time-varying electrical signal, the amplitude of which at any instant is a function of the apparent brightness of the incremental area then being scanned. In these prior art systems, this electrical signal is amplified to increase the differences in amplitude of the signals representing nearly the same apparent brightness, and then is supplied to the intensity control element of a cathode-ray tube indicator, the beam of which is caused to scan a screen along a path which is similar to the scanning path of a photoelectric device. This results in an image being formed on the screen of the cathode-ray tube in which the apparent brightness of each individual area is a function of the apparent brightness of the corresponding area of the subject. However, in the system just described, the percentage difference between the apparent brightness of two different areas can be increased by increasing the amplification of the electrical signal supplied to the intensity controlled element. These systems of the prior art may or may not include means for limiting the maximum amplitude of the signals supplied to the indicator thereby to limit the maximum brightness of any area of the image. The inclusion of such a limiter is desirable since the ability of the eye to perceive slight differences in apparent brightness is reduced by the presence of an area of greater brightness within the field of view of the eye. Certain of the prior art systems also include means for selecting the range of gray values of the subject which are to be enhanced. Obviously, if the areas of apparent brightness on the subject range from black to white it is impossible to enhance the contrast of all areas of the subject at the same time.

These systems of the prior art represent a great advance over the direct viewing of the subject by the unaided eye but all of the systems of the prior art are subject to certain limitations. For example, in many instances it is desirable to enhance areas of low brightness to a greater degree than areas of higher brightness owing to the ability of the human eye to perceive smaller actual differences in brightness at lower light levels. These smaller actual differences represent the same percentage difference as larger actual differences at higher brightness values. In general this is either difficult or impossible to accomplish in prior systems.

Also it may be desirable to enhance selectively the differences in brightness of only those areas of very low brightness or only those areas of very high brightness. Since areas of low brightness are usually represented by electrical signals of small amplitude, the design of amplitude selection circuits which will work well at these low signal levels and also perform satisfactorily at higher signal levels is extremely difficult.

In some instances it may be desirable to employ less than the full range of brightness values available at the screen of the indicator or to change on the screen of the indicator the range of gray values of the subject which are there represented without changing the degree of brightness enhancement of the areas under observation. Again this is either difficult or impossible to accomplish in many of the systems of the prior art.

Therefore it is an object of the present invention to provide an improved viewing system which includes means for changing the apparent relative brightness values of an image of a subject.

It is a further object of the invention to provide in a viewing system improved means for changing the degree of contrast enhancement between areas of different apparent brightness.

Still another object of the invention is to provide a novel system for creating a visual display representing variations in amplitude of an electrical signal.

It is a further object of the present invention to provide an improved system for amplifying selectable amplitude ranges of an electrical signal.

Still another object of the present invention is to provide a novel display system in which the upper and lower limits of brightness selected for enhancement are individually selectable.

These and other objects of the invention are achieved in a preferred embodiment of the invention by providing means for generating an electrical signal having instantaneous amplitudes which are functions of the apparent brightness values of the respective elemental areas of the subject. This signal is then passed through an amplifier means having a greater gain for signals of small amplitude than for signals of large amplitude. The amplified signal is passed through adjustable signal limiting means to an indicator providing an intensity modulated visual display. It will be shown presently that placing the non-linear amplifier means ahead of the adjustable signal limiting means avoids many of the difficulties encountered in the use of circuits of the prior art.

Figure 1:
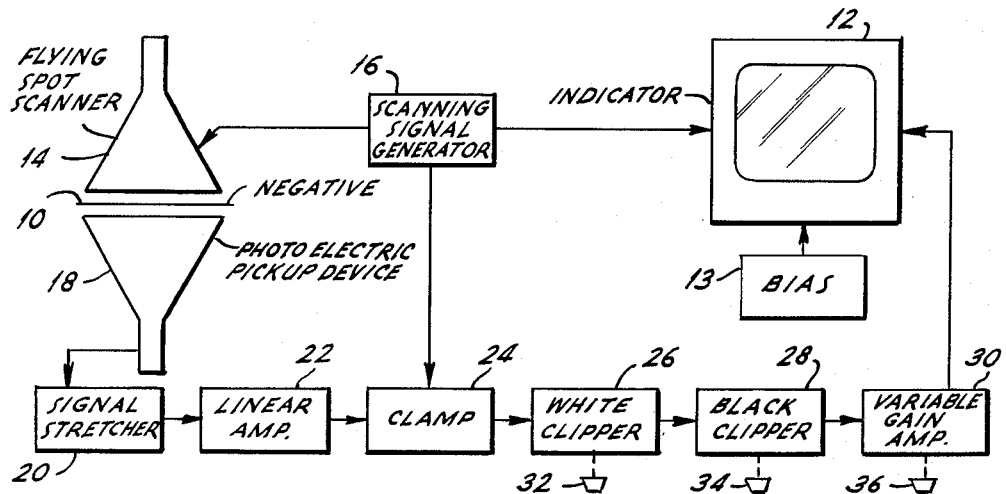
FIG. 1 is a block diagram of one system which embodies the invention.

Turning now to FIG. 1, the subject to be viewed is shown at 10. In this illustrative embodiment subject 10 is a photographic negative. Block 12 represents a cathode-day tube indicator on which the image of subject negative 10 is to be displayed. A flying spot scanner 14 is employed for illuminating the negative 10. Flying spot scanners are well known in the art and need no detailed description. However by way of illustration, flying spot scanner 14 may comprise a cathode-ray tube having an electron beam of constant intensity which is caused to scan a rectangular area of the screen to produce a television type raster. It will usually be desirable to employ interlaced scanning on the flying spot scanner in order that the image of the subject on indicator 12 may be viewed at high brightness level without appreciable flicker. It has been found that scanning the flying spot scanner at the standard television rate of a 262½ line field in 1/60 of a second permits images to be displayed on indicator 12 with a highlight brightness exceeding 100-foot lamberts without causing any noticeable flicker. For reasons which are well known, it is desirable to employ a short persistence phosphor on the screen of the flying spot scanner 14 in order to produce a high definition image on indicator 12. It is also desirable to turn off the beam of the flying spot scanner during flyback in order to establish a definite black level in the generated electrical signal.

The negative 10 may be placed directly adjacent the screen of the flying spot scanner 14 or, alternatively, the raster traced on the screen of the flying spot scanner may be focused on the negative by suitable optical means. The beam deflection signals required by flying spot scanner 14 and indicator 12 may be provided by scanning signal generator 16. The use of a common source of scanning signals for indicator 12 and scanner 14 assures that the raster on indicator 12 will be a faithful reproduction of the raster employed by flying spot scanner 14. However, separate scanning generators synchronized by a common source may be substituted for the common source 16 if desired.

The light passing through negative 10 is intercepted by a photoelectric pick-up device 18. Again photoelectric pick-up device 18 may be placed directly adjacent negative 10 or the light passing through negative 10 may be focused on the active surface of the pick-up device by a suitable optical means. Photoelectric pick-up device 18 may be a photomultiplier tube which converts the time varying light signals passing through negative 10 to time varying electrical voltages which resemble the video signal of a television system.

It should be understood that the invention is not to be limited to the particular means shown for scanning the subject as other equivalent means may be employed for scanning transparent subjects. Suitable optical or electrical means, for example a conventional television camera, may be employed for scanning the surfaces of luminous or reflective objects.

The electrical signal from photomultiplier tube 18 is supplied to the input of signal stretcher 20. As will be explained in more detail later, signal stretcher 20 is an amplifier which has a greater gain for signals of small amplitudes than it has for signals of larger amplitudes. Signal stretcher 20 may take the form of a logarithmic amplifier circuit or a gamma corrector circuit of the type employed in television broadcasting.

The output signal of signal stretcher 20 is passed through a linear amplifier 22 to the input of a gated clamp circuit 24. In the embodiment of FIG. 1, the gating signal for clamp circuit 24 is supplied by scanning signal generator 16. Clamp circuit 24 is a circuit for establishing the black level of the electrical signal which occurs at one extreme amplitude excursion of the signal at a preselected voltage level before the signal is supplied to the signal clipping or limiting means. One preferred form of circuit for accomplishing this result is described in more detail in FIG. 2.

A signal at the output of clamp circuit 24 is supplied through two series connected clipping circuits 26 and 28 to the input of a variable gain amplifier 30. Clipping circuits 26 and 28 are provided with manual clipping level controls 32 and 34, respectively. As will be explained in more detail later, clipping circuits 26 and 28 permit only those signals lying between two selectable amplitude levels to be passed from amplifier 22 to amplifier 30. These levels are selected by adjusting controls 32 and 34, respectively.

The output signal of amplifier 30 is supplied to the intensity control element of indicator 12. Amplifier 30 may be a conventional amplifier, the gain of which can be controlled by manual gain control means 36. Amplifier 30 should provide sufficient gain for raising the maximum excursions of the signal at its output to the "black" and the "white" levels, respectively, of indicator 12. Indicator 12 may be provided with an adjustable bias source represented at 13 to permit changing the average brightness level of the displayed image.

Figure 2:
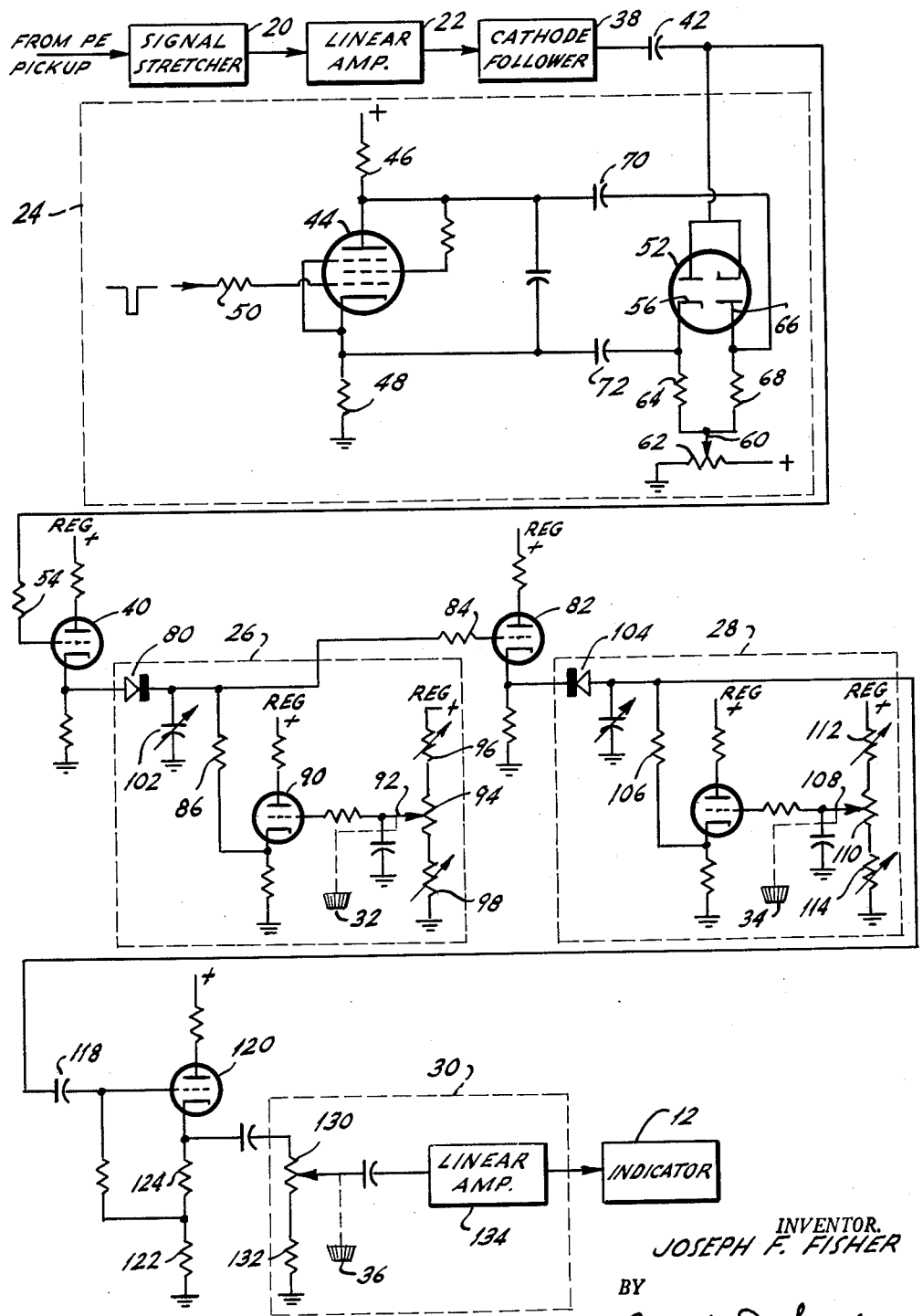
FIG. 2 is a diagram partially in schematic form of a portion of a preferred embodiment of the invention which is arranged in a manner similar to the block diagram of FIG. 1.

FIG. 2 shows in greater detail a preferred embodiment of the invention arranged in accordance with the block diagram of FIGURE 1. Circuits in FIG. 2 corresponding to like circuits in FIG. 1 are identified by the same reference numerals. In FIG. 2 the output of linear amplifier 22 is connected to the input of clipper 26 through a cathode follower 38 shown in block form and a second cathode follower circuit 40 shown in schematic form. Cathode follower coupling between stages is employed in the circuit of FIG. 2 to achieve maximum stability and optimum performance of the separate circuits shown in block form in FIG. 1. The cathode followers shown in schematic form in FIG. 2 employ a resistor in the grid circuit and another resistor in the anode circuit to prevent self-oscillation in the circuits at high frequencies. These resistors may have a resistance of the order of 100 ohms, hence they have no noticeable effect on the cathode follower action of the stage at video frequencies.

A capacitor 42 provides coupling between cathode follower 38 and cathode follower 40. Clamp circuit 24 acts to maintain the plate of capacitor 42 which is connected to the grid of cathode follower 40 at a selected potential for the zero amplitude portion of the video signal from the pick-up device 18. That is, clamp circuit 24 sets the "black level" of the electrical signal at the grid of cathode follower 40 at a selected D.C. level. This causes the clipping levels established by circuits 26 and 28 to be independent of changes in the average brightness of the subject.

As shown in FIG. 2, clamp circuit 24 comprises a phase splitting amplifier 44 which has equal anode and cathode load resistors 46 and 48 respectively. The gating signal for the clamp circuit 24 is supplied to the input connection 50 of the amplifier stage 44. The actual clamping operation is performed by a dual diode 52. One anode and one cathode of diode 52 are connected to the control grid of cathode follower 40. The effect of resistor 54 may be neglected because of the low value of impedance of this resistor.

A second cathode of diode 52 is connected to an adjustable tap 60 on a potentiometer 62 through a load resistor 64. Load resistor 64 may have an impedance of the order of 1 megohm. Similarly the second anode of diode 52 is connected to tap 60 through a load resistor 68. Potentiometer 62 is connected between ground and a source of positive potential. As will be explained in detail presently, the potential at tap 60 sets the clamping level for circuit 24. The anode of amplifier stage 44 is capacitively coupled to the anode 66 of diode 52 through capacitor 70. The cathode of stage 44 is capacitively coupled to the cathode 56 of tube 52 through coupling capacitors 72.

A "white clipper" 26 includes a diode 80 the anode of which is connected to the cathode of cathode follower 40. Diode 80 may be a vacuum tube or any suitable solid state rectifying device. The cathode of diode 80 is connected to the control grid of a cathode follower 82 through an oscillation suppression resistor 84. A resistor 86 forms the load impedance for diode 80 and is connected to the cathode of this diode. The end of resistor 86 remote from diode 80 is maintained at a selected constant potential by means of a cathode follower 90. The control grid of cathode follower 90 is connected to the adjustable tap 92 on a potentiometer 94. Potentiometer 94 forms a central element of a series voltage divider arrangement which also includes variable resistors 96 and 98. This series combination is connected between ground and a source of regulated positive potential. The series circuit just described provides means for supplying a positive bias-potential to the grid of cathode follower 90 the amplitude of which can be varied between upper and lower limits set by resistors 96 and 98 by varying the position of tap 94. As will be explained in more detail later, varying the potential at the grid of cathode follower 90 varies the level at which the negative peaks of the video signal are clipped by diode 80.

An adjustable capacitor 102 is connected between the anode of diode 80 and ground to balance out stray circuit capacitances associated with the clipper circuit.

The black clipper 28 of FIG. 2 is similar to white clipper 26 except that in the black clipper 28 the cathode of diode 104 is connected to the cathode of cathode follower 82. Load impedance 106, tap 108, potentiometer 110 and variable resistors 112 and 114 correspond to elements 86, 92, 94, 96 and 98, respectively, in white clipper 26.

The anode of diode 104 is coupled by means of a capacitor 118 to the grid of a cathode follower stage 120. In cathode follower circuit 120 resistor 122 is the load impedance, resistor 124 is a biasing impedance for the tube in the cathode follower circuit. Again the anode resistor is employed as a decoupling or oscillation suppression resistor.

A potentiometer 130 is capacitively coupled to the output terminal of cathode follower 120. The other terminal of potentiometer 130 is connected to ground through a resistor 132. As shown in FIG. 2, the movable tap on potentiometer 130 is coupled to the manual gain control means 36 and forms the gain control element of linear amplifier 30. The remaining portion of amplifier 30 has been shown in block form at 134 since it is conventional.

The operation of the system shown in FIGS. 1 and 2 will now be explained with reference to the waveforms of FIGS. 3, 4 and 5. The manner in which the difference densities of the negative 10 are converted to time varying electrical signals has already been explained. As mentioned above, the electrical signals generated by photomultiplier tube 18 are supplied to the input of signal stretcher 20.

The operation of signal stretcher 20 is illustrated in FIGS. 4A, 4B and 4C. FIG. 4A is a plot 160 of output signal amplitude versus input signal amplitude for signal stretcher 20. FIG. 4B is an amplitude versus time plot of an input signal which may be supplied to signal stretcher 20. FIG. 4C is an amplitude versus time plot of the output signal of signal stretcher 20 which corresponds to the input signal of FIG. 4B. FIG. 4B is so arranged that the amplitude scale of this figure corresponds to the "Input Signal Amplitude" scale of FIG. 4A. Similarly FIG. 4C is positioned so that its amplitude scale corresponds to the "Output Signal Amplitude" scale of FIG. 4A.

The waveform 150 in FIG. 4B represents the signal which would be supplied to photomultiplier 18 during the scanning of one line on a negative 10 which, in this example, is assumed to comprise a series of bands of different density running perpendicular to the line scanning direction. In drawing FIG. 4B a uniform gradation in the density of the bands from opaque to transparent has been assumed. Thus level 152 represents the "black" level of subject 10 and step 154 represents a nearly transparent or "white" area of subject 10. Steps 156, 157 and 158 represent areas of different partial transparency or intermediate "gray" areas of the subject 10.

In FIG. 4A the characteristic curve 160 of signal stretcher 20 may be logarithmic or exponential in form or it may follow some arbitrarily selected curve. It is desirable but not absolutely essential that curve 160 be a smooth curve. It lies within the scope of the invention to employ a characteristic that comprises two or more straight lines of different slope. Of the various possible characteristics a logarithmic characteristic is preferred since this causes the movement required of manual control knobs 32 and 36 to shift the clipping level from one shade of gray to the next distinguishable shade of gray to be substantially the same over the entire range from black to white. It will be recognized that this is a great improvement over prior art systems which employ only linear amplifiers ahead of the clipping circuits. In prior art circuits control 32 for example might have to be rotated through one unit to move from one shade of gray to the next distinguishable shade of gray at a light level of 100 foot lamberts and rotated through only one 1/100 of a unit to move from one shade of gray to the next distinguishable shade of gray in an area of the image having a brightness of 1.0 foot lamberts. Further by way of example, the step from signal level 157 to the next higher level 162 may be equivalent to 25 or more recognizable shades of gray while the equal step from signal level 158 to the next lower level 164 may represent only five recognizable shades of gray at the high level of brightness. It should be remembered that the steps from level 157 to level 162 and from level 164 to 158 represent equal numerical differences in brightness level.

Figure 4:
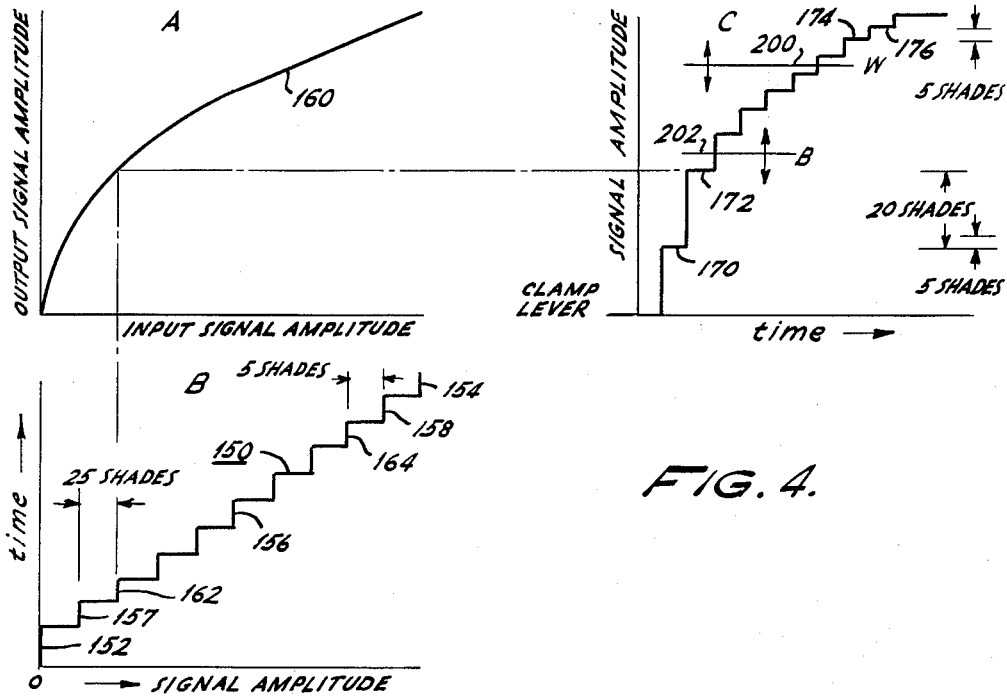
FIG. 4 is a series of waveforms which illustrate the operation of the signal stretcher which forms a portion of the system of FIG. 1.

FIG. 4C is a plot showing the output signal provided by signal stretcher 20 in response to an input signal as shown in FIG. 4B. In FIG. 4C the step from level 170 to 172 corresponds to the step from level 157 to 162 in FIG. 4B. Similarly the step from level 174 to level 176 represents the step from level 164 to level 158 in FIG. 4B. It should be noted that the differences in signal amplitude representing equal numerical differences in brightness values are no longer equal in FIG. 4C. However, as indicated in FIG. 4, the differences in signal amplitude representing equal numbers of recognizable shades of gray are more nearly equal in the signal of FIG. 4C than in the signal of FIG. 4B.

Turning once again to FIGS. 1 and 2 it will be seen that the signal at the output of linear amplifier 22 will be a reproduction of the signal represented by FIG. 4C except for an increase in amplitude and a possible phase inversion.

Clamping circuit 24 does not alter the shape of the signal waveform. It merely shifts the D.C. level of a selected point on the waveform to a preselected voltage level. This is accomplished in the following manner. A negative pulse signal is supplied to the input connection 50 of phase-splitting amplifier 44 at the time that the beam on the flying spot scanner is retracing following the scanning of one line along the negative 10. During this retrace the beam of the flying spot scanner is turned off. Therefore a signal from the photomultiplier tube 18 represents the true black level of the signal. The negative pulse signal appearing at the cathode of amplifier stage 44 is supplied to the cathode 56 of dual diode 52. Similarly the positive pulse on the anode of amplifier stage 44 is supplied to the anode 66 of dual diode 52. As explained in greater detail in Television Engineering Handbook, edited by Donald G. Fink, McGraw-Hill Book Company, Inc., 1957, Chapter 11, page 41, the diode 52 acts to clamp the black level of the video signal appearing at the right-hand plate of capacitor 42 to the D.C. potential established by tap 60 of potentiometer 62.

In the physical embodiment of the invention from which the schematic diagram of FIG. 2 was taken the signal appearing at the output of cathode follower 38 is inverted with respect to the signal shown in FIG. 4C. That is, the black level is the most positive portion of the signal and white and gray areas are represented by negative going signals. Therefore tap 60 must be set so that it is at a positive potential at least equal to the negative peaks of the signals supplied by cathode follower 38.

Figure 3:
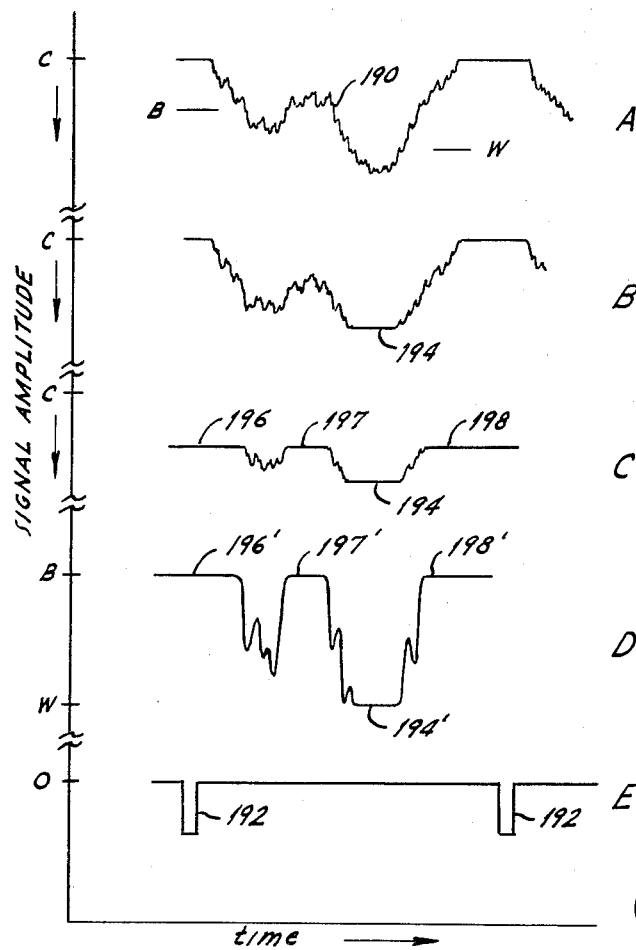
FIG. 3 is a series of waveforms which serve to illustrate the operation of the system of FIG. 1.

Waveform 190 of FIG. 3A represents the signal appearing at the output of cathode follower 38 as one line of a typical negative is scanned. An irregular waveform has been chosen for illustration in FIG. 3 in place of the stepped waveform of FIG. 4 in order more fully to illustrate the operation of the clipping circuits. The pulses 192 of FIG. 3E correspond to the clamping pulses supplied to clamp circuit 24. These pulses are shown in FIG. 3 to provide a convenient time reference. The reference levels "C" shown on the signal amplitude scales represent the clamping level set by circuit 24. The levels "B" and "W" in FIG. 3D represent the levels which will drive indicator 92 to the "black" and "white" conditions respectively.

Turning now to clipping circuit 26 of FIG. 2, it will be seen that the signal at the anode of diode 80 will have the waveshape as shown at 190 in FIG. 3A. The cathode of diode 80 is biased by the circuit including cathode follower 90. The output impedance of cathode follower 90 is low compared to the impedance of resistor 86. Therefore this cathode follower 90 can be considered as a zero impedance bias source connected between the lower terminal of resistor 86 and ground. The D.C. potential appearing at the cathode of cathode follower 90 is determined by the voltage divider network connected to its grid. This voltage divider is connected between ground and a source of positive voltage. This voltage may be a regulated voltage if good circuit stability is desired. The resistors 96 and 98 set the potential at the two terminals of potentiometer resistance 94. It will be seen presently that resistors 96 and 98 thereby set the upper and lower clipping limits which may be selected by control 32. The position of tap 92 may be adjusted by means of control 32 so that the grid of cathode follower 90 is at a selected potential between the limits set by resistors 96 and 98. The potential at the cathode follower 90 will be approximately equal to the potential of the grid.

The clipping action takes place in the following manner. As long as the anode of diode 80 is more positive than the cathode, conduction occurs through this diode and a signal is developed across load resistor 86 which has a waveshape the same as the corresponding portion of waveform 190 of FIG. 3A. If the signal on the anode 80 drives the anode more negative than the cathode of this diode, conduction will cease through the diode. The potential at the cathode will drop to the bias level set by cathode follower 90 but will not drop below the level. Therefore, the signal appearing across resistor 86 will have a waveshape as shown in FIG. 3B. Portion 194 of this signal waveform represents the bias level for the cathode of diode 80 which is set by tap 92.

The signal appearing across resistor 86 is supplied through cathode follower 82 to clipping circuit 28. The operation of clipping circuit 28 is similar to that of clipping circuit 26. However, the diode 104 of clipping circuit 28 is reversed with respect to diode 80. Therefore diode 104 conducts only when the signal supplied by cathode follower 82 is of sufficient amplitude to drive the cathode of diode 104 more negative than its anode.

FIG. 3C represents the signal developed across load resistor 106 of clipper circuit 28. Portion 194 again represents the limiting or clipping action of circuit 26. Portions 196, 197 and 198 represent the limiting or clipping action produced by circuit 28.

If the signal shown in FIG. 3C were to be supplied to a cathode-ray tube indicator, areas represented by portions 196, 197, and 198 would appear as an area of moderately intense illumination which is herein referred to as dark gray. Area 194 would appear as a slightly more intensely illuminated area, i.e. as a lighter shade of gray. The variable portions of the signals between the two clipping levels will be represented as intermediate shades of gray.

The elimination of white areas on the screen of the indicator by the action of the clipper 26 would increase the apparent contrast of the remaining areas by a slight amount. Greater enhancement can be obtained by amplifying the signal of FIG. 3C as shown at FIG. 3D until regions 196', 197' and 198' are at levels representing "black" on the indicator screen and portion 194' is at the level representing "white" on the screen. The amount of amplification required depends upon the difference between the clipping levels set by controls 32 and 34. The necessary gain control is provided by potentiometer 130 which is tapped across the output circuit of cathode follower 120. The input signal for cathode follower 120 is the signal developed across resistor 106. The position of the tap of potentiometer 130 may be adjusted by control 36 so that the signal level at the output of amplifier 134 is at the proper level.

Figure 5:
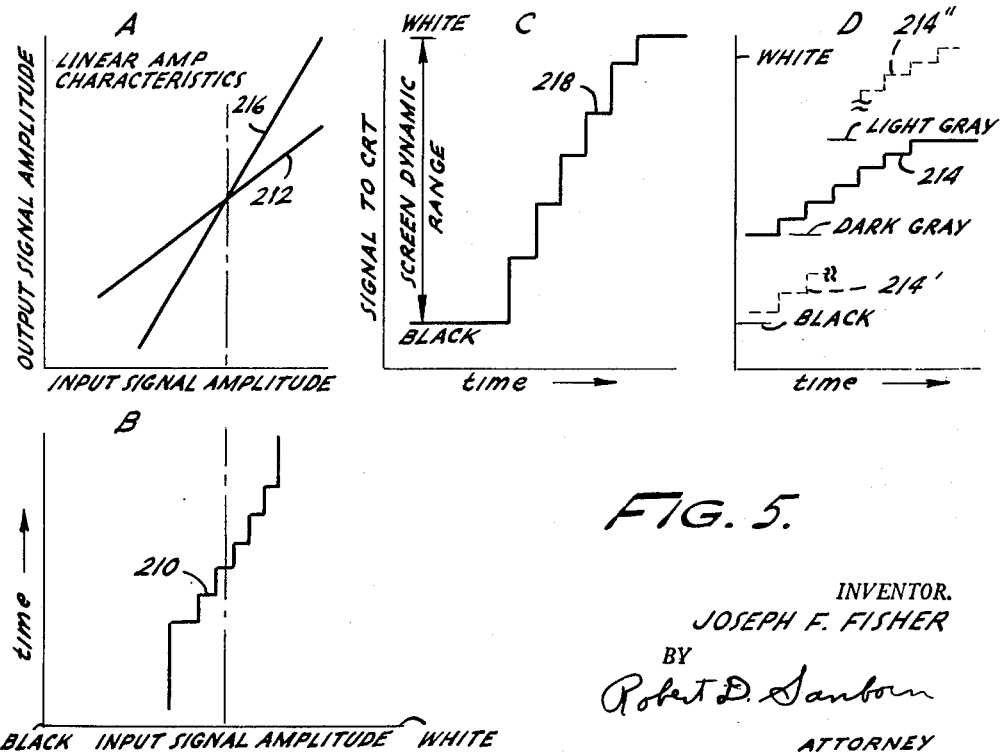
FIG. 5 is another series of waveforms which further illustrate the operation of the variable gain amplifier portions of the system of FIG. 1.

The action of amplifier 30 in increasing the contrast is further illustrated in FIG. 5. In FIG. 5B waveform 210 represents the portion of the signal of FIG. 4C lying between the assumed clipping levels 200 and 202 of that figure. In FIG. 5A line 212 represents the output signal versus input signal characteristic of amplifier 30 for a relatively low setting of the manual gain control 36. Waveform 214 of FIG. 5D represents the signal supplied to indicator 12. As indicated in this figure, the signal represented by waveform 214 does not have sufficient amplitude to produce both black and white areas on the screen. However, by adjusting the bias on the indicator 12 supplied by source 13 in a well known manner the entire image may be made darker or lighter as desired. Changing the bias is equivalent to shifting waveform 214 to position 214' or 214".

Line 216 of FIG. 5A represents the output signal versus input signal characteristic amplifier 30 corresponding to a relatively high setting of the gain control. The resultant output signal in response to the input signal 210 of FIG. 5B is shown as waveform 218 in FIG. 5C. The increased contrast is represented by the larger steps in waveform 218 than in waveform 214.

Those familiar with the reproduction of television displays will recognize that the inclusion of the signal stretcher in the circuit between the pick-up device and the indicator will correct for the well known nonlinear relationship between input signal amplitude and brightness in a cathode-ray tube indicator. In addition, placing the signal stretcher ahead of the clipping circuits instead of after the clipping circuits which would be usual circuit practice gives rise to several heretofore unrecognized advantages. As will now be seen from FIG. 4C, moving control 32 or 34 by a fixed amount will move the white clipping level as represented by line 200 or the black clipping level represented by line 202 through approximately the same number of recognizable shades of gray regardless of the initial position of the clipping level. Furthermore the amount by which the clipping level must be changed to go from one recognizable shade to the next has been greatly increased in the vicinity of the black level. This permits much finer adjustment of the clipping levels in the darker areas of the subject than was possible in prior art circuits. Since it is now possible to set the two clipping levels close together at or near the black level much greater contrast enhancement can be achieved in the darker portions of subject than was possible employing circuits of the prior art. Still another advantage of applicant's novel placement of the signal stretcher ahead of the clipping circuits lies in the fact that the low amplitude signals representing areas of very low brightness are amplified to a level greater than the inherent noise level in the diode clippers without requiring a corresponding increase in the over-all dynamic range of the signal. The separately controlled clipper circuits permit any desired brightness range of the subject to be selected for enhancement. Furthermore it permits the operator to delete gradations in brightness appearing at either or both extremes of the brightness range of the image without changing the degree of enhancement of the brightness values still displayed.

Various modifications may be made in the preferred embodiments shown in the drawing which lie within the scope of the invention. The cathode-ray indicator described herein may be replaced by another form of indicator which will suitably display the time variations in amplitude of the signal passed by the signal clipping circuits. Variations in the gain 30 is employed to set the maximum amplitude of the signal supplied to indicator 12 at the optimum value for best presentation regardless of the amplitude difference between the upper and lower clipping levels set by circuits 26 and 28. Obviously variable gain amplifier 30 may be omitted or replaced by an amplifier having a fixed gain if the maximum amplitude of the signal at the output of the clipping circuit is at the proper level for driving the indicator or does not vary appreciably from subject to subject.

In addition to the contrast enhancement described above, it has been found advantageous in certain cases to display the different amplitude levels of signal representing the enhanced image by different colors rather than as different intensities on a monochrome indicator. To accomplish this the signal from clipper 28 or amplifier 30 of FIG. 1 may be fed to a color converter circuit. By means of special circuitry the signals ranging from the black level to the white level are converted to saturated colors going through a range, for example of blue, cyan, green, yellow and red. The use of a color indicator has the advantage that it is relatively easy to identify relatively small, separate areas of equal brightness since these areas are displayed in the same color. The color indicator may be employed in place of, or in addition to, a monochrome indicator.

Therefore, while the invention has been described with reference to the preferred embodiments thereof, it will be apparent that various other modfications and other embodiments thereof will occur to those skilled in the art within the scope of the invention. Accordingly I desire the scope of my invention to be limited only by the appended claims.

What is claimed is:

1. In a signal processing system which includes a source of signals which undergo amplitude variations as a function of time, the combination comprising a non-linear amplifier means and first and second manually adjustable clipping circuits coupled in cascade in the order recited, said non-linear amplifier means including means for causing the instantaneous output signal amplitude versus instantaneous input signal amplitude characteristic to decrease in slope as a function of increasing instantaneous input signal amplitude for at least a limited range of amplitude values having one limit at approximately zero amplitude, one of said clipping circuits comprising means for passing only signal amplitude variations below a first selectable amplitude level, the other of said clipping circuits comprising means for passing only signal amplitude variations above a second selectable amplitude level, said first and second amplitude levels being independent of the average amplitude of the signal supplied by said source, said second selectable amplitude level being lower than said first selectable amplitude level, means coupled to said first and second manually adjustable clipping circuits for setting said first and second selectable amplitude levels, means coupling said source to the input of said non-linear amplifier means, and means for deriving an output signal from said second adjustable clipping circuit.

2. A signal processing system in accordance with claim 1 wherein the instantaneous output signal amplitude vs. instantaneous input signal amplitude characteristic of said amplifier means decreases in slope as a continuous smooth function of increasing input signal amplitude over said amplitude range.

3. A signal processing system in accordance with claim 1 wherein said second selectable level is adjustable over a range of amplitude values having one limit at approximately zero amplitude.

4. A signal processing system in accordance with claim 1 wherein said clipping circuits are individually adjustable.

5. In a signal processing system which includes a source of signals which undergo amplitude variations as a function of time and an indicator for producing luminous signals the instantaneous intensities of which are a function of the instantaneous amplitude of an electrical signal supplied to said indicator, the combination comprising a non-linear amplifier means and first and second individually adjustable clipping means coupled in cascade in the order recited, said non-linear amplifier means including means for causing the instantaneous output signal amplitude versus instantaneous input signal amplitude characteristic to decrease in slope as a function of increases in instantaneous signal amplitude for at least a limited range of amplitude values having one limit at approximately zero amplitude, values having one limit at approximately zero amplitude, said first adjustable clipping means comprising means for passing only signal amplitude variations below a first selectable amplitude level, said second adjustable clipping means including means for passing only signal amplitude variations above a second selectable amplitude level, means for manually adjusting said first and second clipping means to vary said first and second amplitude levels, said selectable amplitude levels being independent of the average amplitude of the signal supplied by said source, means coupling said source of signals to the input of said amplifier means, second amplifier means coupling the output of said second clipping means to said indicator, said second amplifier means having a substantially linear input versus output characteristic, and manually adjustable means for varying the gain of said second amplifier.

6. A signal processing system as in claim 5, said system further comprising gated signal clamping means connected between the output of said nonlinear amplifier means and the input of said cascaded clipping means for setting the level of time selected portions of said signal supplied to said clipping means to a preselected level.

7. A system for creating a viewable display of the time variations in amplitude occurring within a selected range of amplitude values of a time varying electrical signal, said system comprising an indicator including means for converting electrical signals of different amplitudes to brightness signals of different intensities, electrical signal amplifying means, said electrical signal amplifying means including means for amplifying portions of said electrical signal which are representative of brightness signals of lesser intensity on said indicator to a greater degree than other portions of said electrical signal, manually adjustable signal limiting means responsive to the output signal of said electrical signal amplifying means, said adjustable signal limiting means including means for passing only those amplitude variations of the amplified electrical signal lying between first and second electrical amplitude levels which are independent of the average amplitude of said time varying electrical signal, and means for supplying the signal passed by said adjustable signal limiting means to said indicator.

8. A system for producing a contrast enhanced image of a subject on the screen of an indicator, said system comprising means for providing a first electrical signal having at different times instantaneous amplitudes which are functions of the apparent brightness of different elemental areas of said subject, an indicator for providing luminance signals the instantaneous intensities of which are a function of the instantaneous amplitudes of an electrical signal supplied to said indicator, non-linear amplifier means responsive to said first electrical signal and providing an amplified electrical signal, said non-linear amplifier means including means for providing an instantaneous output signal amplitude versus instantaneous input signal amplitude characteristic which decreases in slope with increasing instantaneous input signal amplitude, manually adjustable signal limiting means responsive to the output signal of said non-linear amplifier means, said adjustable signal limiting means comprising means for passing only those variations in amplitude of said amplified electrical signal lying between first and second selectable amplitude levels which are independent of the average amplitude of said time varying electrical signal, variable gain amplifier means connected to receive at its input signals passed by said signal limiting means, manually adjustable means for varying the gain of said variable gain amplifier means, and means coupling the output of said variable gain amplifier means to said indicator.

9. In a signal processing system which includes a source of signals which undergo amplitude variations as a function of time, the combination comprising nonlinear amplifier means including means for providing an instantaneous output signal amplitude vs. instantaneous input signal amplitude characteristic that decreases in slope as a function of increasing instantaneous input signal amplitude for at least a limited range of amplitude values having one limit at approximately zero amplitude, first and second adjustable diode clipping circuits connected in cascade, one of said diode clipping circuits comprising means for clipping the positive peaks of a signal supplied thereto, and the other of said diode clipping circuits comprising means for clipping the negative peaks of the signals supplied thereto, means coupled to said diode clipping circuits for setting the clipping levels of said first and second diode clipping circuits independently of the average value of the signals supplied by said source, means coupling the input of said amplifier means to said source, means coupling the output of said amplifier means to the input of the cascade arrangement of said first and second adjustable diode clipping circuits, and means for deriving an output signal from the output of said cascade arrangement of first and second diode clipping circuits.

10. In a signal processing system which includes a source of signals which undergo amplitude variations as a function of time and an indicator for producing luminous signals the instantaneous intensities of which are functions of the instantaneous amplitude of an electrical signal supplied to said indicator for amplitudes not greater than a first value, the combination comprising nonlinear amplifier means including means for providing an instantaneous output signal amplitude vs. instantaneous input signal amplitude characteristic that decreases in slope with increasing input signal amplitude for at least a limited range of amplitude values having one limit at approximately zero amplitude, first and second adjustable diode clipping circuits arranged in cascade, one of said diode clipping circuits comprising means for clipping the positive peaks of a signal supplied thereto, and the other of said diode clipping circuits comprising means for clipping the negative peaks of a signal supplied thereto, means coupled to said diode clipping circuits for setting the clipping levels of said first and second diode clipping circuits, means coupling the output of said nonlinear amplifier means to the input of said cascade arrangement of said first and second clipping circuits, said last-mentioned coupling means including gated signal clamping means for setting the level of time selected portions of the signal supplied to said cascaded diode clipping circuits to a preselected level, and means coupling the output of said cascaded clipping circuits to said indicator.

11. A signal processing system in accordance with claim 10 wherein said means coupling the output of said cascaded clipping circuits to said indicator comprises a second amplifier means, said signal processing system further comprising manually adjustable means associated with said second amplifier means for varying the gain thereof.

References Cited in the file of this patent
UNITED STATES PATENTS

| | | |
|---|---|---|
| 2,692,299 | Longini | Oct. 19, 1954 |
| 2,717,931 | Duke | Sept. 13, 1955 |
| 2,724,738 | Babbs | Nov. 22, 1955 |
| 2,743,313 | Schwarz | Apr. 24, 1956 |
| 2,898,457 | Auerbach | Aug. 4, 1959 |
| 2,910,531 | Fathauer | Oct. 27, 1959 |